US008898801B2

(12) United States Patent
Mariana

(10) Patent No.: US 8,898,801 B2
(45) Date of Patent: Nov. 25, 2014

(54) METHOD FOR PROTECTING A DIGITAL RIGHTS FILE DESCRIPTION

(75) Inventor: Renaud Mariana, Paris (FR)

(73) Assignee: Viaccess (FR)

( * ) Notice: Subject to any disclaimer, the term of this patent is extended or adjusted under 35 U.S.C. 154(b) by 2053 days.

(21) Appl. No.: 11/883,818

(22) PCT Filed: Feb. 9, 2006

(86) PCT No.: PCT/FR2006/050111
§ 371 (c)(1),
(2), (4) Date: Aug. 6, 2007

(87) PCT Pub. No.: WO2006/085029
PCT Pub. Date: Aug. 17, 2006

(65) Prior Publication Data
US 2008/0141368 A1 Jun. 12, 2008

(30) Foreign Application Priority Data
Feb. 11, 2005 (FR) ...................................... 05 50411

(51) Int. Cl.
*G06F 7/04* (2006.01)
*G06F 21/10* (2013.01)

(52) U.S. Cl.
CPC ........ *G06F 21/10* (2013.01); *G06F 2221/0797* (2013.01)
USPC ......................................................... 726/27

(58) Field of Classification Search
USPC ......... 726/27, 16, 21, 26, 59; 705/71; 380/44, 380/262, 278, 279
See application file for complete search history.

(56) References Cited

U.S. PATENT DOCUMENTS

2001/0037224 A1* 11/2001 Eldridge et al. .................. 705/4
2003/0115144 A1 6/2003 Stefik et al.
2004/0019801 A1* 1/2004 Lindholm et al. ............ 713/200
2004/0044906 A1* 3/2004 England et al. ............... 713/200
2004/0054678 A1* 3/2004 Okamoto et al. ............. 707/100
2004/0054899 A1* 3/2004 Balfanz et al. ................ 713/168

FOREIGN PATENT DOCUMENTS

EP          1045388          10/2000
WO   WO 2006/085029          8/2006

OTHER PUBLICATIONS

PCT Preliminary Examination Report W/ English Translation of Amended Sheets; PCT Notification of Transmission; Supporting Papers.
XP-002391500; Section 1.9 Hash functions; pp. 321-323.

* cited by examiner

*Primary Examiner* — Dante Ravetti
(74) *Attorney, Agent, or Firm* — Baker Hostetler LLP

(57) ABSTRACT

The invention relates to a method of protecting a file containing a plurality of rights descriptions $D_i$ (i=1 ... N), each right $D_i$ defining use by a terminal of at least one resource and/or digital content among a plurality of resources and/or digital contents $RC_j$ (j=1 ... M), each description of a given right $D_i$ comprising particularly,
  an identifier of said right $D_i$,
  an identifier of each resource and/or content $RC_j$, the use of which is defined by said right $D_i$,
  conditions for use of said resources and/or said contents by the terminal.
This method includes the following steps:
  on reception of the rights descriptions file $D_i$ by a terminal, storing said descriptions in the terminal, and,
  for each resource and/or content $RC_j$, generating a data structure (Id_$RC_j$, Id_$D_i$), comprising the identifier of said resource and/or said content and the identifier of each right defining a use of said content $RC_j$,
  transferring each (Id_$RC_j$, Id_$D_i$) structure generated into a secure memory area.

25 Claims, 4 Drawing Sheets

METHOD FOR PROTECTING A DIGITAL RIGHTS FILE DESCRIPTION

TECHNICAL DOMAIN

This invention relates to the field of protection of digital resources and contents using the Digital Rights Management (DRM) technique.

More specifically, the invention relates to a method of protecting a file containing a plurality of rights descriptions $D_i$ (i=1 ... N, where N is an integer number), each right $D_i$ defining use by a terminal of at least one resource and/or digital contents among a plurality of resources and/or digital contents $RC_j$ (j=1 ... M, where M is an integer number) distributed or made available to one or a plurality of users each having multimedia terminals, each description of a given right $D_i$ comprising particularly an identifier of said right $D_i$, an identifier of each resource and/or content $RC_j$, the use of which is defined by said right $D_i$ and by conditions for use of said resources and/or said contents $RC_j$.

The invention also relates to a multimedia terminal comprising a non-secure memory area, a secure memory area and a security processor, said non-secure memory area being designed to store at least one file containing a plurality of rights descriptions $D_i$ (i=1 ... N) each defining the use of at least one resource and/or digital content among a plurality of resources and/or digital contents $RC_j$ (j=1 ... M), each description of a given right $D_i$ particularly comprising an identifier of said right $D_i$, an identifier of each resource and/or content $RC_j$ for which use is defined by said right $D_i$, and conditions for use of said resources and/or said contents.

A content $RC_j$ is a digital file comprising in particular an identifier and data forming the document that it represents. These data may represent one or several audiovisual or multimedia programs. These programs may be distributed in plain text, or they may be encrypted by a secret key securely stored in the terminal.

A resource $RC_j$ may be a computer function of the terminal, for example such as a personal directory management program, or a peripheral device connected to the terminal, for example such as a hard disk type mass memory, the use of which is governed by conditions recorded in the rights file.

A right $D_i$ is a collection of data describing how a digital content or a computer resource can be used. In general, a right is described in XML (for Extensible Markup Language) documents, particularly containing the identifier of this right, a (Stateful/Stateless) attribute specifying if the right is modified during its use, one or several content descriptions (Assets) particularly including the content identifier (ContentId) and possibly the cryptogram of a key CEK used to decrypt this content, and a description of permissions and constraints indicating how the content can be used. The key may be encrypted by a key dependent on the right emitter, securely supplied to the terminal to which the content is intended. The degree of security of the content or the resource depends essentially on the degree of security of the right associated with this content or this resource.

STATE OF PRIOR ART

Known digital rights management techniques are based on a DRM application using software and hardware modules for the processing of digital objects representative of the contents with which usage rights (RightObject) are associated.

In DRM techniques according to prior art, the security of rights is achieved essentially by software solutions in which all information contained in the XML document describing a right is stored in a public space in the user's terminal. Thus, this information may be retrieved and modified and/or used fraudulently.

One solution known in prior art consists of using an encryption key stored in the security processor associated with the terminal to make the communication channel between the user and the content supplier secure. This solution only provides protection during transport, and cannot protect the right when the right has been received and stored in the terminal memory.

Furthermore, considering the large size of a rights file and the power of the description language in the XML format, it is difficult to store this file in a security processor and to perform processing on the right due to the memory capacity and the limited processing power of existing security processors.

Another purpose of the invention is to improve the security level of the right associated with a content or a resource, taking account of limitations on the processing power and storage capacity of the right.

PRESENTATION OF THE INVENTION

This purpose is achieved using a method based on a DRM application in which sensitive information in a rights document is extracted from this document for secure processing.

The invention recommends a method of protecting a file containing a plurality of right descriptions $D_i$ (i=1 ... N), each right $D_i$ defining use by the terminal of at least one resource and/or digital content among a plurality of resources and/or digital contents $RC_j$ (j=1 ... M), each description of a given right $D_i$ comprising in particular, an identifier of said right $D_i$,
an identifier of each resource and/or content $RC_j$, the use of which is defined by said right $D_i$,
conditions for use of said resources and/or said contents by the terminal.

The method according to the invention comprises the following steps on reception of the right descriptions file $D_i$ by a terminal:

storing said descriptions in the terminal, and
for each resource and/or content $RC_j$, generating a data structure (Id_$RC_j$, Id_$D_i$), comprising the identifier of said resources and/or said content and the identifier of each right defining a use of said content $RC_j$,
transferring each (Id_$RC_j$, Id_$D_i$) structure generated into a secure memory area.

Steps in the method according to the invention are carried out by a DRM application software, also called the <<DRM agent>> in the remainder of the description, transparently for the terminal user.

The method according to the invention also comprises a step that consists of verifying that there is not already a structure comprising the right $D_i$ identifier in the secure memory, before each transfer of a structure (Id_$RC_j$, Id_$D_i$) into this secure memory area.

This step avoids modifying directly an existing right without previously deleting it, or fraudulently associating a new content with an existing right.

Furthermore, the method according to the invention comprises steps executed in a secure environment intended to assure the integrity of the right associated with the content or with the resource that the terminal user is requested to use. These steps are:

calculating a cryptographic digest of each description of right $D_i$, generating a pair (Id_D$_i$, Cnd_D$_i$) comprising the identifier of right D$_i$ and the cryptographic digest of the description of this right, transferring the generated pair into said secured memory area.

Storing the (Id_D$_i$, Cnd_D$_i$) pair in the secure memory area provides a means of obtaining a reference so that any later fraudulent attempt to modify the right associated with the content will be observed.

When a user requires to use a given content and/or resource RC$_k$, the DRM agent executes a preliminary check phase consisting of verifying that:

the identifier of at least one right D$_m$ is associated with the identifier of said resource and/or content RC$_k$ in the secure memory area, and the description of the right D$_m$ corresponds to the requested use.

For the requested use, the check phase also comprises a step consisting of recalculating a cryptographic digest Cndc_D$_m$ of the right D$_m$ stored in the terminal and comparing the digest Cndc_D$_m$ obtained with the digest Cnd_D$_m$ of the right D$_m$ associated with the identifier of said resource and/or content RC$_k$ in the secure memory area.

The method according to the invention also comprises an authorization phase executed by the DRM agent when the content RC$_k$ is encrypted and, in a first variant of the invention, consists of retrieving the secret key if the identifier of a right D$_m$ is associated with the identifier of said content RC$_k$ in the secure memory area, and if the description of the right D$_m$ corresponds to the requested use.

In a second variant embodiment, said authorisation phase consists of retrieving the secret key if the recalculated cryptographic content Cndc_D$_m$ is also identical to the memorised cryptographic digest Cn_D$_m$ in the secure memory area, and if the description of the right D$_i$ corresponds to the requested use.

In a third variant embodiment, when the protected resource is software and/or a hardware device, the phase authorising use of this resource consists of executing said software and/or activating said device if the identifier of a right D$_m$ is associated with the identifier of said resource RC$_k$ in the secure memory area, and if the description of the right D$_m$ corresponds to the requested use.

In a fourth variant embodiment, if the resource is a software and/or hardware device, said authorisation phase consists of executing said software and/or activating said device if the recalculated cryptographic digest Cndc_D$_m$ is identical to the memorised cryptographic digest Cn_D$_m$ in the secure memory area, and if the description of the right D$_m$ corresponds to the requested use.

The terminal according to the invention comprises:

software and/or hardware means for generating a data structure (Id_RC$_j$, Id_D$_i$) from the description of each right D$_i$ and for each resource and/or content RC$_j$ identified in said right, comprising the identifier of said resource and/or said content and the identifier of said right, means for transferring each generated structure into a secure memory area.

Preferably, the terminal according to the invention also comprises:

software and/or hardware means for calculating a cryptographic digest Cnd_D$_i$ of each right description D$_i$, means of generating a pair (Id_D$_i$, Cnd_D$_i$) comprising the right identifier D$_i$ and the cryptographic digest of the description of this right.

The secure memory area of the terminal may be a part of the terminal memory or a memory arranged in the security processor. The security processor is preferably a removable smart card.

BRIEF DESCRIPTION OF THE FIGURES

Other characteristics and special features of the invention will become clearer from the following description given as a non-limitative example with reference to the appended figures, wherein.

DETAILED PRESENTATION OF PARTICULAR EMBODIMENTS

The following description relates to a particular application of the method according to the invention to protect the right to use multimedia programs distributed to several subscribers. Access rights to these programs are managed by a DRM application installed in subscriber terminals. The DRM application comprises a software module 1 called the DRM agent in the remainder of this description, responsible for executing steps to secure and to check rights to use multimedia programs. These multimedia programs may be plain or encrypted by a secret key memorised in a smart card associated with the terminal. Programs may be distributed by downloading on subscriber terminals, for example through the Internet, using an xDSL link or a telephone network, or by broadcasting for example through a radio or cable network. Programs may also be distributed on recording media, for example such as CDs (Compact Disc) or DVDs (digital Video Disc) without departing from the scope of the invention. Obviously, the method is not limited to this type of content and is applicable to controlling the security and checking rights to use any resource (software or hardware), for which use is governed by rights D$_i$ described in a digital file. In particular, each description of a given right D$_i$ comprises an identifier of said right D$_i$, an identifier of each resource and/or content RC$_j$ for which the use is defined by said right D$_i$, and conditions for use of said resources and/or said contents.

Figure 1:
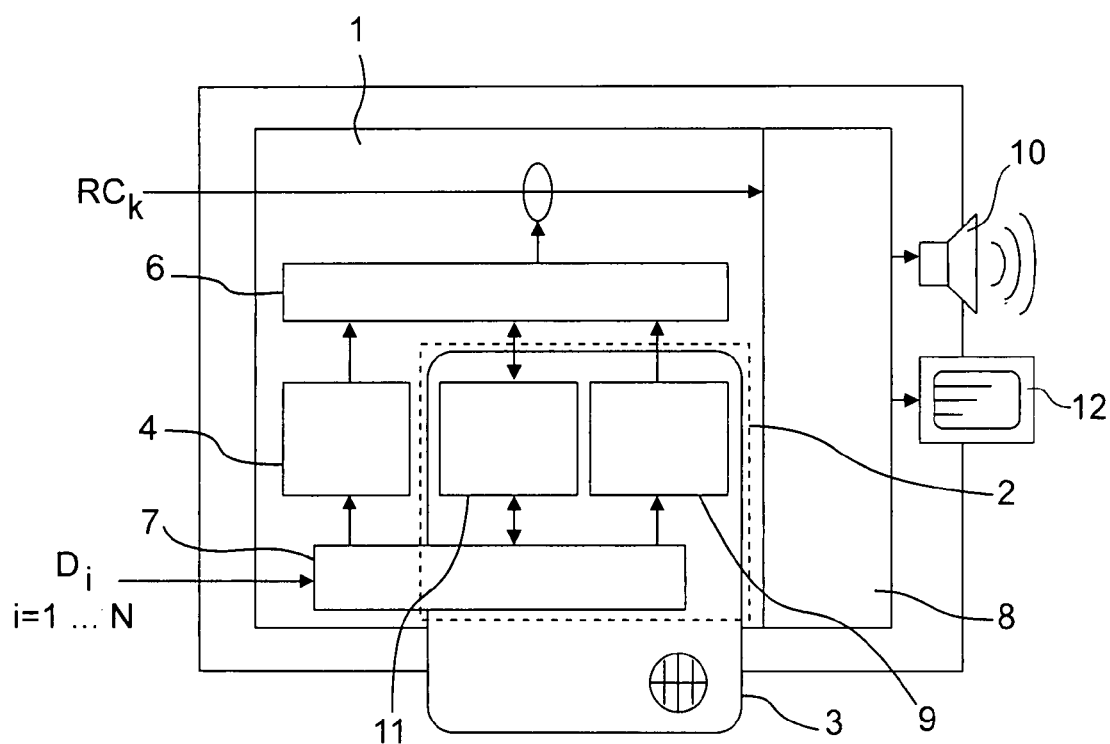
FIG. 1 diagrammatically illustrates the general architecture of a terminal in which the method according to the invention is used.

FIG. 1 diagrammatically shows the architecture of a subscriber terminal comprising a DRM agent 1, a smart card reader 2 designed to contain a smart card 3 specific to the subscriber and provided with a secure memory 9 and a secure processing area 11, a memory area 4 designed to store right files containing a plurality of right descriptions D$_i$ (i=1 ... N) each defining the use of multimedia programs, a module 6 for checking said rights, a rights processing module 7 containing software that cooperates with the DRM agent 1 to secure rights D$_i$, and a multimedia reader 8 for execution of said multimedia programs. The terminal also comprises an audio output 10 and a display screen 12.

Security of Rights

When the terminal receives the right descriptions file, the security phase is initialised by the DRM agent. The DRM agent stores said descriptions in the terminal, and for each right description, it generates a data structure (Id_$RC_j$, Id_$D_i$) for each multimedia program identified in said right, the data structure comprising the identifier Id_$RC_j$ of said program and the identifier Id_$D_i$ of said right. The DRM agent then transfers each generated structure into the secure memory 9 of the smart card 3.

Figure 2:
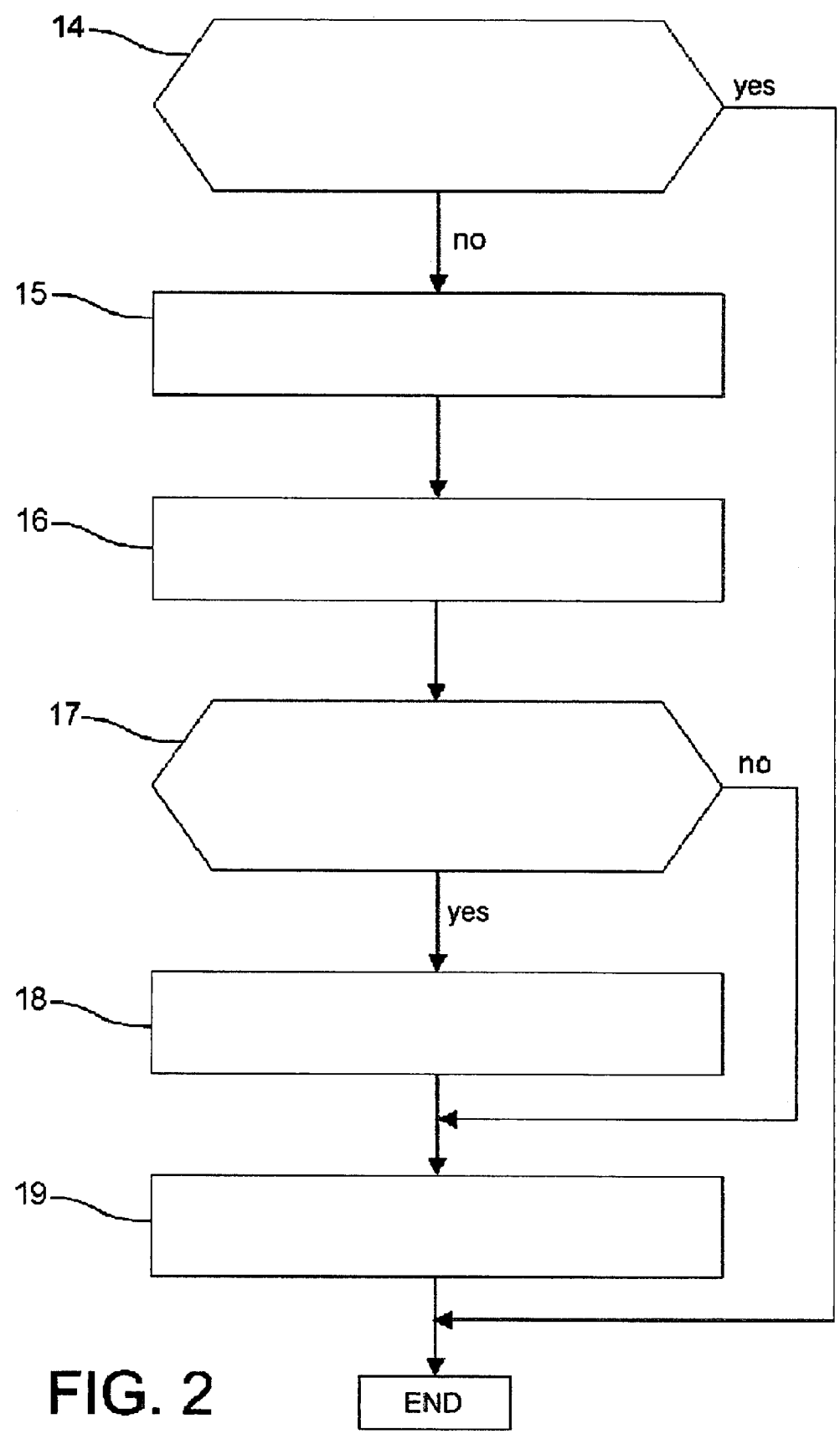
FIG. 2 is a flowchart representing the steps in achieving security of a right in a preferred embodiment of the method according to the invention.

Steps in the security phase will now be described in detail with reference to FIG. 2.

When a file of rights $D_i$ (i=1 ... N) is received, for each right $D_i$, the rights processing module 7 verifies if the secure memory 9 of the smart card 3 already contains at least one pair (Id_$RC_x$, Id_$D_i$) representing the right $D_i$, in step 14. If it does, the security process is interrupted for this right $D_i$. Otherwise, in step 15, the rights processing module 7 transfers the description of the right $D_i$ into the memory 4 of the terminal. For each multimedia program $RC_k$ identified in said right $D_i$, in step 16, the rights processing module 7 then generates a structure (Id_$RC_k$, Id_$D_i$) and memorises this generated structure in the secure memory 9 of the smart card 3. This structure (Id_$RC_k$, Id_$D_i$) comprises the identifier of the multimedia program $RC_k$ and the identifier of the right $D_i$ referencing this program. If another structure referencing the program $RC_k$ associated with another right $D_z$ already exists, the generated structure may be combined with this other structure in the form (Id_$RC_k$, Id_$D_i$, Id_$D_z$), this combination being iterative.

If the program $RC_j$ is encrypted (step 17), the rights processing module memorises the decryption key CEK of the received program in encrypted form in the right $D_i$, in step 18.

In a first embodiment, the decryption key CEK of the program $RC_j$ is extracted from the right $D_i$ and decrypted using the parameters specific to the right, and it is then transferred into the secure memory 9 of the smart card in association with the program identifier.

In a second embodiment, the decryption key CEK of the program $RC_j$ is extracted from the right $D_i$ and is decrypted using parameters specific to the right, and it is then encrypted in the secure processing area 11 with a secret key memorised in the secure memory 9 of the smart card. The cryptogram obtained is transferred into the memory 4 of the terminal in association with the program identifier.

In a third embodiment, the decryption key CEK of the program $RC_j$ is left without being decrypted, in the right description $D_i$ memorised in the terminal memory 4.

In one preferred embodiment of the method, the rights processing module 7 calculates a cryptographic digest Cnd_$D_i$ of the right $D_i$ in the secure processing area in step 19, and memorises the pair (Id_$D_i$, Cnd_$D_i$) in the secure memory 9 of the smart card 3.

Use of Multimedia Programs

When a user selects a multimedia program $RC_k$ (video and/or audio or game), for example by clicking on an icon representing this program, he triggers start-up of the multimedia reader 8. The reader 8 retrieves the selected program and submits it to the DRM agent 1. The DRM agent views the rights definition base stored in the memory 4, identifies the right(s) appropriate for the selected multimedia program and then submits this (these) right(s) to the check module 6 that checks whether or not they exist and are valid. The DRM agent 1 also selects the best right among these identified rights, before or after the checks carried out by the check module 6.

Figure 3:
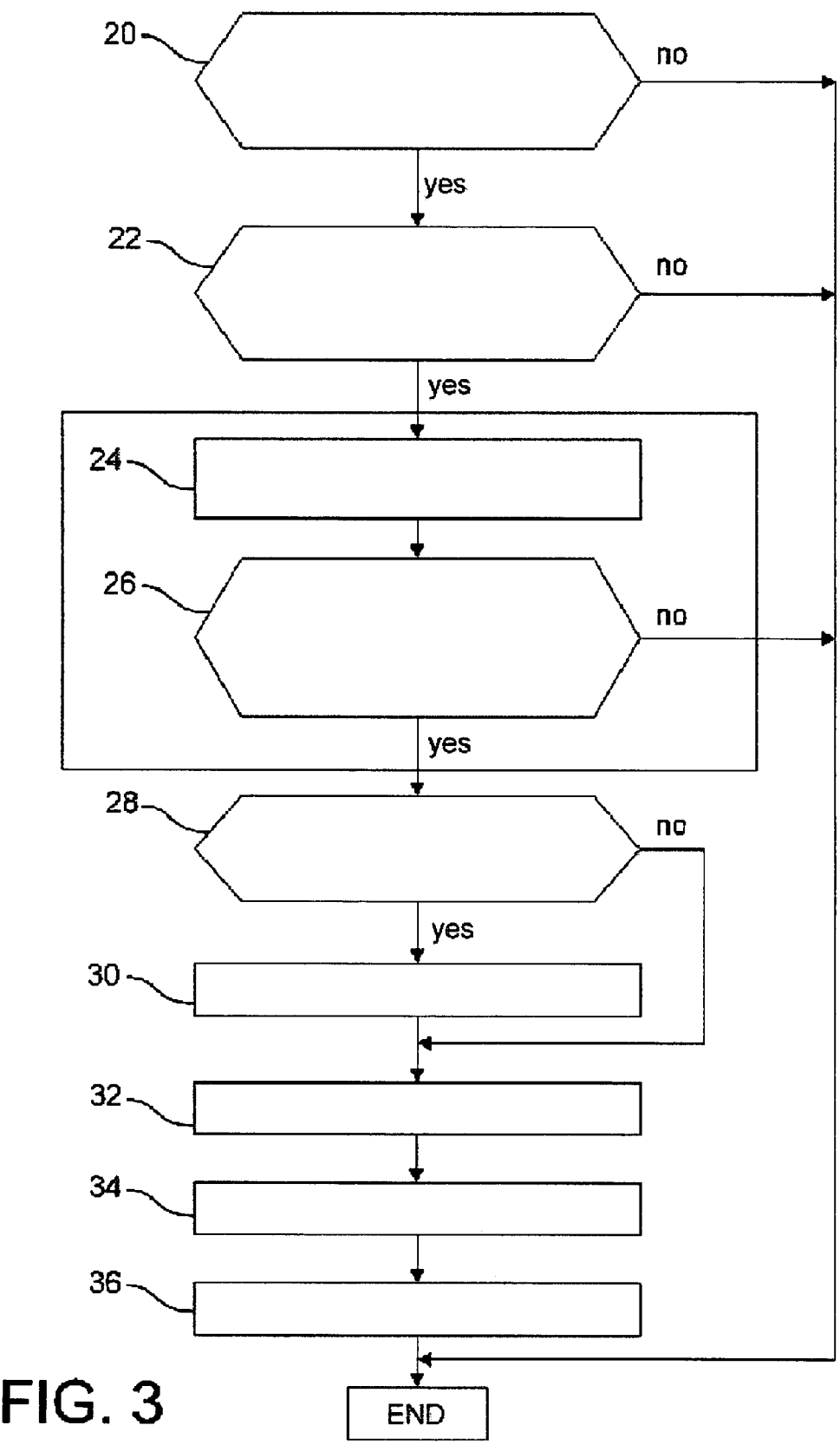
FIG. 3 is a flowchart showing the steps in the verification of a right to use a resource and/or content in a first variant embodiment of a method according to the invention.

FIG. 3 diagrammatically shows a first method of checking the existence and validity of a right associated with the selected program $RC_k$. In this case, the check module 6 firstly searches in the memory 4 of the terminal for a right $D_m$ conform with the use requested by the user of the multimedia program, in step 20.

Use is prohibited if there is no right complying with the user's request available in the memory 4.

If a right $D_m$ complying with the user's request is present in the memory 4, the check module then verifies, in step 22, whether or not the pair (Id_$RC_k$, Id_$D_m$) is present in the secure memory 9 of the smart card 3.

If this pair (Id_$RC_k$, Id_$D_m$) is not present in the secure memory of the smart card, then use is prohibited. Otherwise, the check module 6 optionally calculates a cryptographic digest Cndc_$D_m$ of the right $D_m$ for which the description is memorised in the terminal memory 4, in the secure processing area 11 in step 24, and compares this calculated digest Cndc_$D_m$ with the digest Cnd_$D_m$ previously transferred into the secure memory 9 of the smart card during the security phase.

If the calculated digest Cndc_$D_m$ is not identical to the digest Cnd_$D_m$ stored in secure memory 9 of the smart card, then use is prohibited.

If the calculated digest Cndc_$D_m$ is identical to the digest Cnd_$D_m$, or if the check on the digest of the right $D_m$ is not made, the check module 6 verifies whether or not the multimedia program is encrypted, in step 28.

If the multimedia program is encrypted, the check module 6 retrieves the decryption key CEK of the program in step 30, and sends an authorization to use the decrypted program to the multimedia reader 8 in step 32.

In a first embodiment, the decryption key CEK is extracted from the secure memory 9 of the smart card 3 where it was stored in association with the identifier of the content Id_$RC_k$ during the securisation of the right $D_m$.

In a second embodiment, the decryption key CEK is obtained from its cryptogram memorised in the memory 4 of the terminal. This cryptogram is decrypted in the secure processing area 11 of the smart card using a secret key stored in the secure memory of the smart card.

In a third embodiment, the cryptogram of the decryption key CEK is extracted from the description of right Dm memorised in the memory 4 of the terminal and the decryption key is obtained by decryption of this cryptogram using parameters present in the description of the right $D_m$.

If the multimedia program is not encrypted, the check module 6 executes step 32 directly.

After the program has been used, the right $D_m$ may have been modified (Stateful/Stateless attribute) for example when the right enables use of the program a limited number of times, the number of uses already made being decremented in the right each time. In this case, the memorised right description memorised in the memory 4 of the terminal is updated in step 34. Furthermore, if the right digest Cnd_$D_m$ exists in the secure memory 9, it is recalculated in the secure processing area 11 in step 36, and is updated in the secure memory 9 of the smart card.

Figure 4:
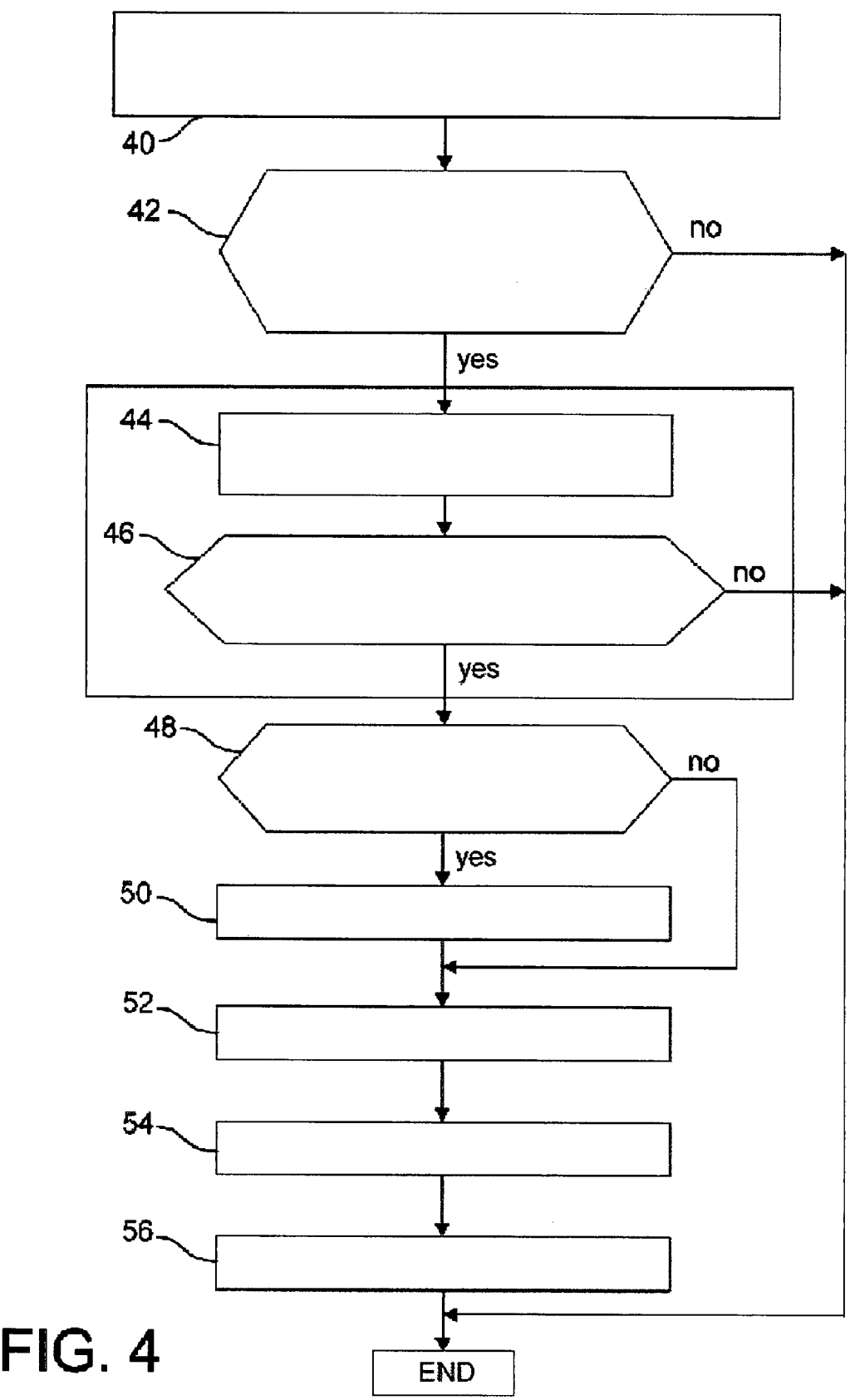
FIG. 4 is a flowchart showing steps in verification of a right to use a resource and/or content in a second variant embodiment of the method according to the invention.

FIG. 4 represents a second method of checking if a right associated with the selected program $RC_k$ exists and is valid. In this mode, in step 40, the check According to another characteristic of the method, the secure memory area in the network, in the smart card or in the SIM card, comprises a date parameter that is updated with the current date during each write or read access to the secure memory area. Any attempt to access the secure memory at a current date earlier than the date contained in this date parameter will be invalidated to prevent use of the terminal by anti-dating.

With the method according to the invention, it is possible to:
- guarantee that a right has been acquired legally, with a high security guarantee,
- check that the right has not been modified since it was last used, because a right integrity check in the secure memory area can be made every time the right is used,
- accelerate verification of rights, since the right is syntactically analysed by the terminal, that usually has a higher processing capacity than a security processor,
- provide a high rights storage capacity while guaranteeing security of use, since only the digest of the right is stored in the secure memory area, the right being stored in the terminal (for example on the hard disk) with no particular protection,
- increase confidence in the integrity of the right and therefore proof of the right, because the digest is calculated by the security processor.

The invention claimed is:

1. Method of protecting a file containing a file containing data stored digitally in a memory of a terminal, the terminal having a processor and a right processing module, a right check module, a security processor, a multimedia reader and a non-secure memory area for storing at least one data file comprising a plurality of right descriptions $D_i$ (i=1 ... N, where N is an integer number), each right $D_i$ defining use by a terminal of at least one resource and/or digital content among a plurality of resources and/or digital contents $RC_j$ (j=1 ... M, where M is an integer number), and with each description of a given right $D_i$ comprising, an identifier of said right $D_i$, an identifier of each resource and/or content RC, the use of which is defined by said right $D_i$, conditions for use of said resources and/or said contents by the terminal, the method comprising the following steps:
- storing, by the terminal processor, said rights descriptions in the terminal;
- generating, by the terminal processor, a data structure ($Id\_RC_j, Id\_D_i$) for each resource and/or content RC, which comprises the identifier of said resource and/or said content;
- defining, by the terminal processor, the use of said content $RC_j$ by the identifier of each right $D_i$;
- generating, by the terminal processor, each ($Id\_RC_j$, $Id\_D_i$) data structure;
- transferring, by the terminal processor, each ($Id\_RC_j$, $Id\_D_i$) data structure generated into a secure memory area in said terminal;
- calculating, by the terminal processor, a cryptographic digest $Cnd\_D_i$ of each description of a right $D_i$;
- associating, by the terminal processor, an identifier $Id\_D_i$ of the right $D_i$ with the identifier of the cryptographic digest $Cnd\_D_i$ that generates a pair ($Id\_D_i$, Cnd $D_i$);
- associating, by the terminal processor, an identifier of at least one right $D_m$ with the identifier id $RC_k$ of said resource and/or content $RC_k$ in the secure memory area;
- transferring, by the terminal processor, the generated pair ($Id\_D_i$, Cnd $D_i$) into said secure memory area;
- transferring, by the terminal processor, a digest Cndc $D_m$ into in the secure memory area;
- verifying, by the terminal processor, that the identifier of at least one right $D_m$ is associated with the identifier Id $RC_k$ of said resource and/or content $RC_k$ in the secure memory area;
- verifying, by the terminal processor, that the description of the right $D_m$ corresponds to a requested use of the resource and/or content $RC_k$;
- recalculating, using the security module a cryptographic digest $Cndc\_D_m$ of the right $D_m$ stored in the terminal;
- comparing, by the terminal processor, the recalculated digest $Cndc\_D_m$ with the digest $Cndc\_D_m$ preciously transferred in the secure memory area; and
- descrambling, by the terminal processor, the resource and/or the content for which the recalculated cryptographic digest $Cndc\_D_m$ is identical to the digest $Cnd\_D_m$ memorized in the secure memory area.

2. Method according to claim 1, in which said secure memory area is part of the memory in said terminal.

3. Method according to claim 1, in which said secure memory area is part of a memory of a removable smart card.

4. Method according to claim 1 further characterized by performing a preliminary check phase that establishing that:
- the identifier of at least one right $D_m$ is associated with the identifier id $RC_k$ of said resource and/or content $RC_k$ in the secure memory area, and
- the description of the right $D_m$ corresponds to the requested use with the check phase also comprising the steps of recalculating a cryptographic digest $Cndc\_D_m$ of the right $D_m$ stored in the terminal and comparing the digest $Cndc\_D_m$ obtained with the digest $Cnd\_D_m$ of the right $D_m$ previously transferred in the secure memory area.

5. Method according to claim 1, in which the resource $RC_j$ is a computer function of the terminal.

6. Method according to claim 1, in which the resource $RC_j$ is a peripheral device connected to the terminal.

7. Method according to claim 1, in which the resource $RC_j$ is an unencrypted audiovisual or multimedia program.

8. Method according to claim 1, in which the digital content $RC_j$ is an audiovisual or multimedia program encrypted by a secret key stored securely in the terminal.

9. Method according to claim 4, further characterized in that the digital content $RC_j$ is encrypted by a secret key stored securely in the terminal; and
- determining, by the terminal processor, that the check phase establishes that the identifier of a right $D_m$ is associated with the identifier to said content $RC_k$ in the secure memory area, and the description of the right $D_m$ corresponds to the requested used; and
- wherein the method is further characterized by authorizing use of the secret key when the recalculated cryptographic digest Cndc $D_m$ is identical to the digest Cnd $D_m$ memorized in that secure memory area, and the description of the right $D_m$ corresponds to the requested use.

10. Method according to claim 8, further characterized in that the digital content $RC_j$ is encrypted by a secret key stored securely in the terminal.

11. Method according to claim 10, further characterized by the step of authorizing access to the file when the identifier $Id\_D_m$ of a right $D_m$ is associated with the identifier $Id\_RC_k$ of said content $RC_K$ in the secure memory area, and the description of the right $D_m$ corresponds to the requested use.

12. Method according to claim 10 further characterized by the step of
- determining, by the terminal processor, that the recalculated cryptographic digest Cndc $D_m$ is identical to the digest Cnd $D_m$ in the secure memory area;
- based on determining, by the terminal processor that the recalculated cryptographic digest Cndc $D_m$ is identical to the digest Cnd $D_m$ in the secure memory area, authorizing access to the file.

13. Method according to claim 8, in which said secret key is encrypted by a second key stored in the secure memory area.

14. Method according to claim 8, in which said secret key is stored unencrypted in the secure memory area.

15. Method according to claim 14, in which said secure memory area is part of the memory in said computer in the terminal.

16. Method according to claim 14, in which said secure memory area is in a removable smart card.

17. Multimedia terminal that contains a right processing module, a right check module, a security processor, a multimedia reader and a non-secure memory area (4) that stores at least one data file containing a plurality of rights descriptions Di(i=1 . . . N) each defining the use of at least one resource and/or digital content among a plurality of resources and/or digital contents $RC_j$(j=1 . . . M), each description of a given right $D_i$ comprising an identifier of said right $D_i$, an identifier of each resource and/or content $RC_j$ for which use is defined by said right $D_i$, and conditions for use of said resources and/or said contents, a secure memory area and a rights processing module and including:

a terminal processor;
memory containing stored instructions, when executed by the terminal processor cause the terminal processor to perform the steps of:
storing said rights descriptions in the terminal;
generating a data structure ($Id\_RC_j$, $Id\_D_i$), for each resource and/or content RC, which comprises the identifies of said resource and/or said content;
defining the use of said content RCj by the identifier of each right Di;
generating each ($id\_RC_j$, $Id\_{Di}$) structure;
transferring each generated ($Id\_RC_j$, $Id\_D_i$) structure into a secure memory area in said terminal;
calculating a cryptographic digest Cnd $D_i$ of each description of a right $D_i$;
associating an identifier $Id\_D_i$ of th right $D_i$ with the identifier of the cryptographic digest $Cnd\_D_i$ to generate a pair ($Id\_D_i$, $Cnd\_D_i$);
associating an identifier of at least one right $D_m$ with the identifier Id $RC_k$ of said resource and/or content $RC_k$ in the secure memory area;
transferring the generate pair ($Id\_D_i$, $Cnd\_D_i$) in said secure memory area;
transferring a digest $Cndc\_D_m$ into in the secure memory area;
verifying that the identifier of at least one right $D_m$ is associated with the identifier Id $RC_k$ of said resource and/or content $RC_k$ in the secure memory area;
verifying that the description of the right $D_m$ corresponds to a requested use of the resource and/or content $RC_k$;
recalculating, using the security module a cryptographic digest $Cndc\_D_m$ of the right $D_m$ stored in the terminal;
comparing the recalculated digest $Cndc\_D_m$ with the digest $Cndc\_D_m$ previously transferred in the secure memory area; and
descrambling the resource and/or the content for which the recalculated
cryptographic digest $Cndc\_D_m$ is identical to the digest $Cnd\_D_m$ memorized in the secure memory area.

18. Terminal according to claim 17, characterized in that said terminal includes a security processor and said secure memory area is stored in the security processor.

19. Terminal according to claim 17, characterized in that said security processor is a removable smart card.

20. Terminal according to claim 17, characterized in that said terminal consists of a mobile telephone.

21. Method according to claim 8, further characterized by the step of:
determining, by the terminal processor, that the check phase establishes that the identifier of a right $D_m$ is associated with the identifier of said content $RC_k$ in the secure memory area, and that the description of the right $D_m$ corresponds to the requested used;
based on the determination that the the check phase establishes that the identifier of a right $D_m$ is associated with the identifier of said content $RC_k$ in the secure memory area, and that the description of the right $D_m$ corresponds to the requested use, authorizing use of the secret key.

22. Method according to claim 8, further characterized by the step of:
determining that the cryptographic digest $Cndc\_D_m$ is recalculated and determined to be identical to the digest $Cnd\_D_m$ in the secure memory area, and the description of the right $D_m$ corresponds to the request use;
based on the determination that the cryptographic digest $Cndc\_D_m$ is recalculated and determined to be identical to the digest $Cnd\_D_m$ in the secure memory area, and the description of the right $D_m$ corresponds to the requested use, authorizing use of the secret key.

23. Method according to claim 7,further characterized by the step of
determining that the identifier $Id\_D_m$ of a right $D_m$ is associated with the identifier $Id\_RC_k$ of said content $RC_k$ in the secure memory area, and the description of the right $D_m$ corresponds to the requested use;
based on the determination that the identifier $Id\_D_m$ of a right $D_m$ is associated with the identifier $Id\_RC_k$ of said content $RC_k$ in the secure memory area, and the description of the right $D_m$ corresponds to the requested use, authorizing access to the file.

24. Method according to claim 7, characterized by the step of authorizing access to the file when the cryptographic digest $Cndc\_D_m$ is recalculated and determined to be identical to the digest $Cndc\_D_m$ in the secure memory area, and the description of the right $D_m$ corresponds to the requested use.

25. Terminal according to claim 19, characterized in that the terminal consists of a mobile telephone.

* * * * *